United States Patent
Lehndorff

(10) Patent No.: US 12,306,058 B2
(45) Date of Patent: May 20, 2025

(54) INTEGRATED TORQUE SENSOR BASED ON MAGNETOSTRICTIVE EFFECT

(71) Applicant: Allegro MicroSystems, LLC, Manchester, NH (US)

(72) Inventor: Ronald Lehndorff, Mainz (DE)

(73) Assignee: Allegro MicroSystems, LLC, Manchester, NH (US)

( * ) Notice: Subject to any disclaimer, the term of this patent is extended or adjusted under 35 U.S.C. 154(b) by 265 days.

(21) Appl. No.: 18/148,517

(22) Filed: Dec. 30, 2022

(65) Prior Publication Data
US 2024/0219248 A1    Jul. 4, 2024

(51) Int. Cl.
G01L 3/10    (2006.01)
G01L 5/169    (2020.01)

(52) U.S. Cl.
CPC .............. G01L 3/102 (2013.01); G01L 5/169 (2020.01)

(58) Field of Classification Search
CPC .......... G01L 3/102; G01L 5/169; G01L 5/221
See application file for complete search history.

(56) References Cited

U.S. PATENT DOCUMENTS

| | | | |
|---|---|---|---|
| 8,453,518 B2 | 6/2013 | Diekmann et al. | |
| 9,810,551 B2 * | 11/2017 | Ausserlechner | G01D 5/142 |
| 9,983,045 B2 | 5/2018 | O'Neill | |
| 10,270,428 B1 | 4/2019 | Geisler et al. | |
| 10,330,499 B2 | 6/2019 | Elliott et al. | |
| 10,706,948 B2 | 7/2020 | Biberidis et al. | |
| 11,079,291 B2 | 8/2021 | Bertin | |
| 11,112,275 B2 | 9/2021 | Bertin | |
| 11,408,755 B2 | 8/2022 | Bertin | |
| 11,662,260 B2 | 5/2023 | Latham et al. | |
| 2019/0187008 A1 * | 6/2019 | Schanz | G01L 3/105 |
| 2023/0296459 A1 | 9/2023 | Latham | |

FOREIGN PATENT DOCUMENTS

JP    6427184 B2 *  11/2018 ............... G01D 5/14

OTHER PUBLICATIONS

U.S. Appl. No. 18/056,821, filed Nov. 18, 2022, Javvaji, et al.
U.S. Appl. No. 18/354,903, filed Jul. 19, 2023, Lassalle-Balier, et al.

* cited by examiner

*Primary Examiner* — Octavia Hollington
(74) *Attorney, Agent, or Firm* — Daly, Crowley, Moffford & Durkee, LLP

(57) ABSTRACT

A sensor, comprising: a supporting member; a permanent magnet that is coupled to the supporting member; and a sensor die having a plurality of sensing elements and processing circuitry formed thereon, the plurality of sensing elements being arranged to generate one or more signals in response to a pattern of magnetic flux density that is produced by the permanent magnet and modulated by an application of force to a shaft, the processing circuitry being configured to map the one or more signals to a value of a force applied to the shaft, and output an indication of the value of the force, wherein the permanent magnet and the sensor die are encapsulated in an encapsulating material, the encapsulating material being used to form a package of the sensor.

18 Claims, 16 Drawing Sheets

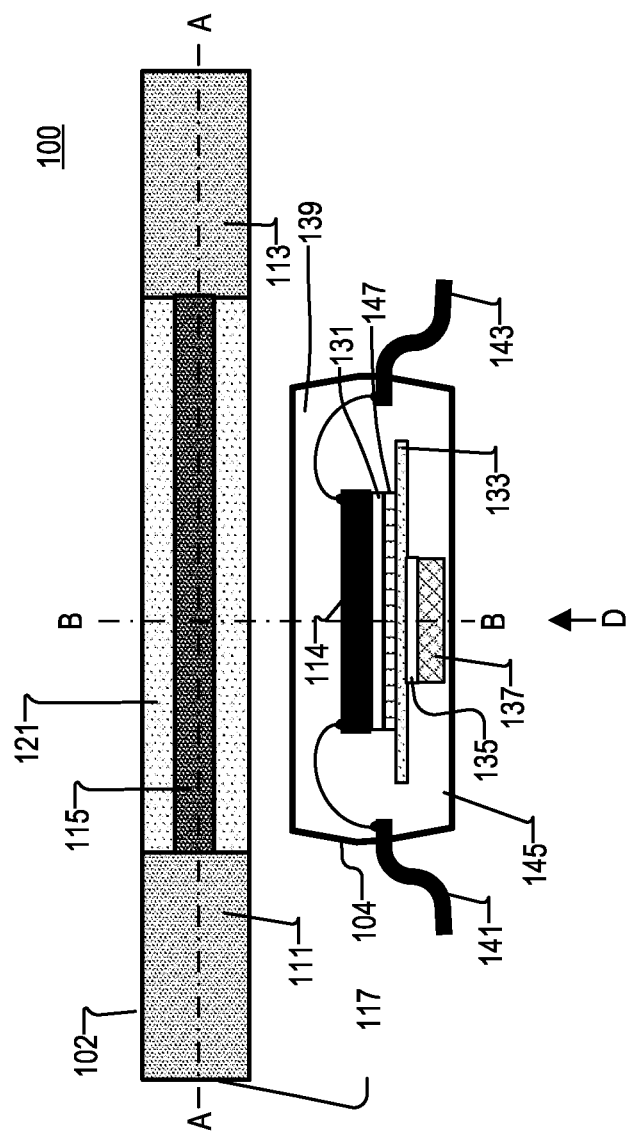

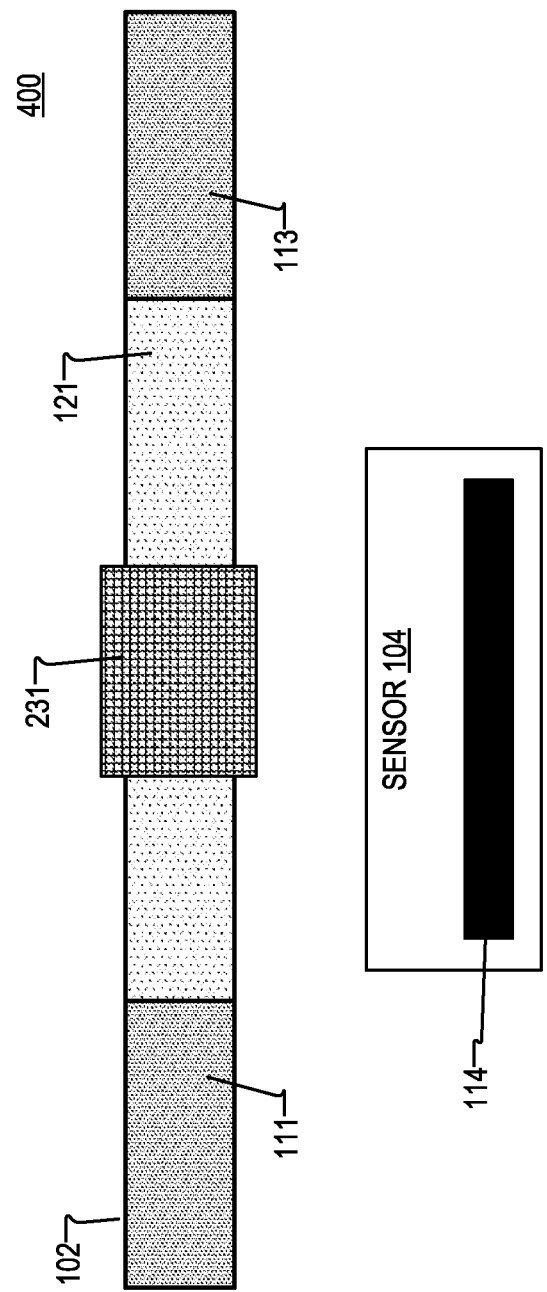

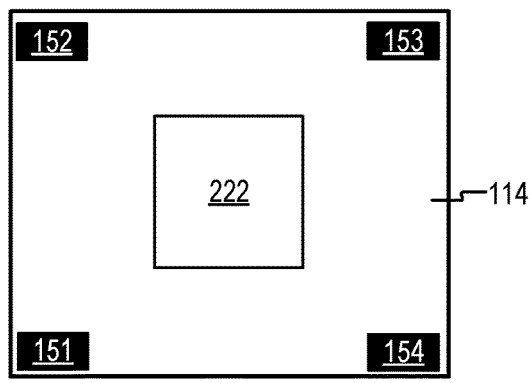
FIG. 2A
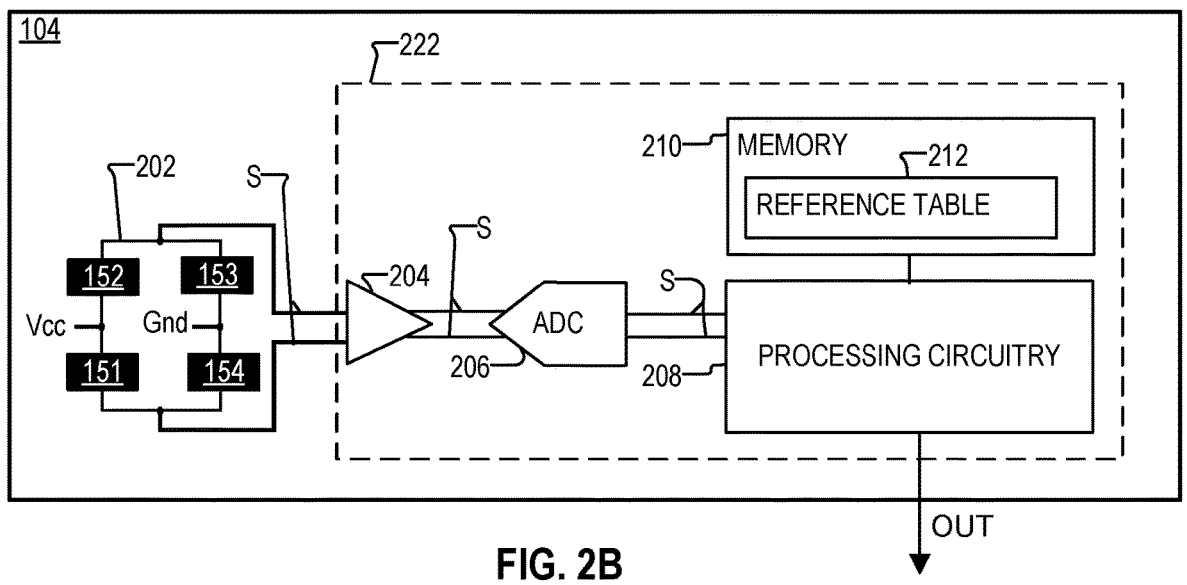
FIG. 2B
FIG. 2C

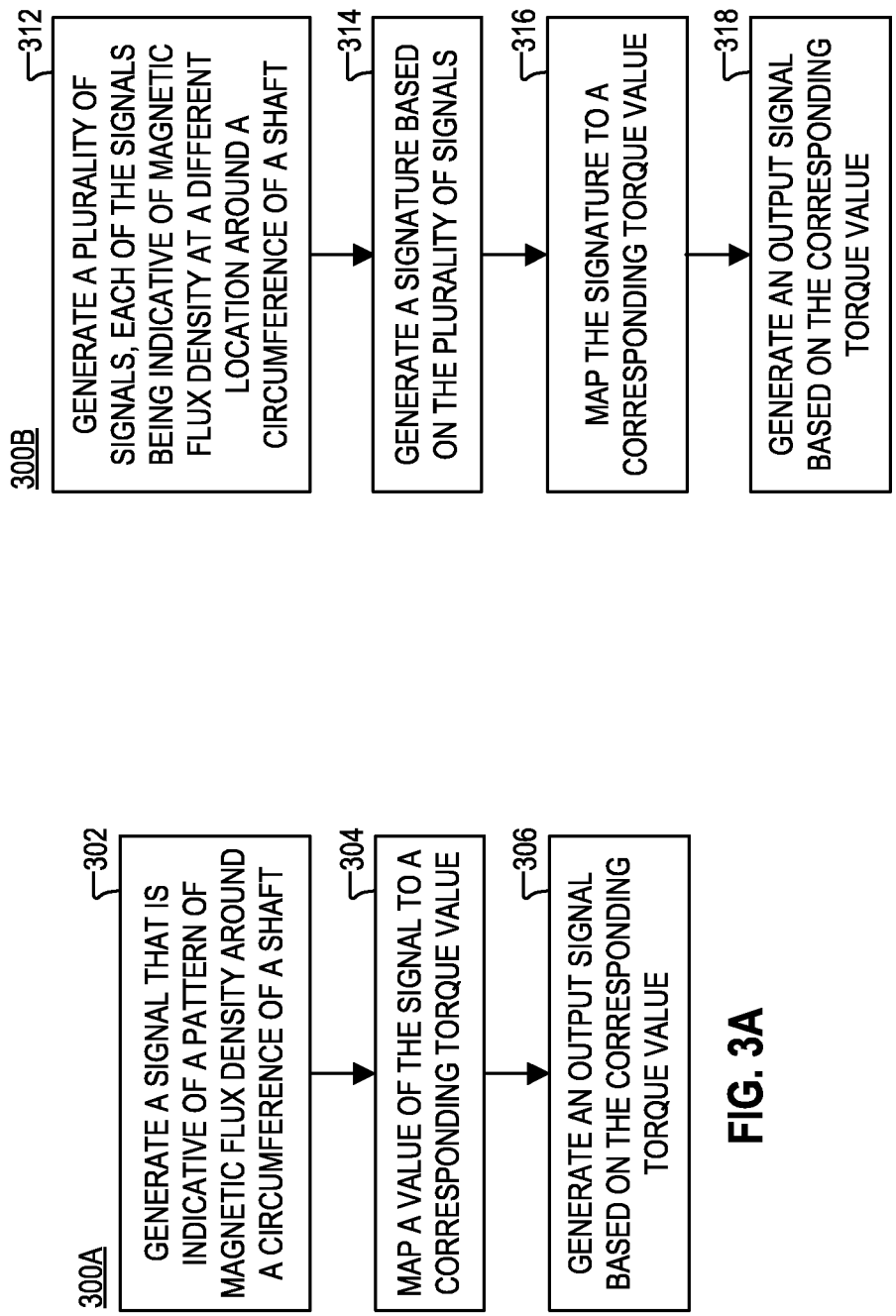

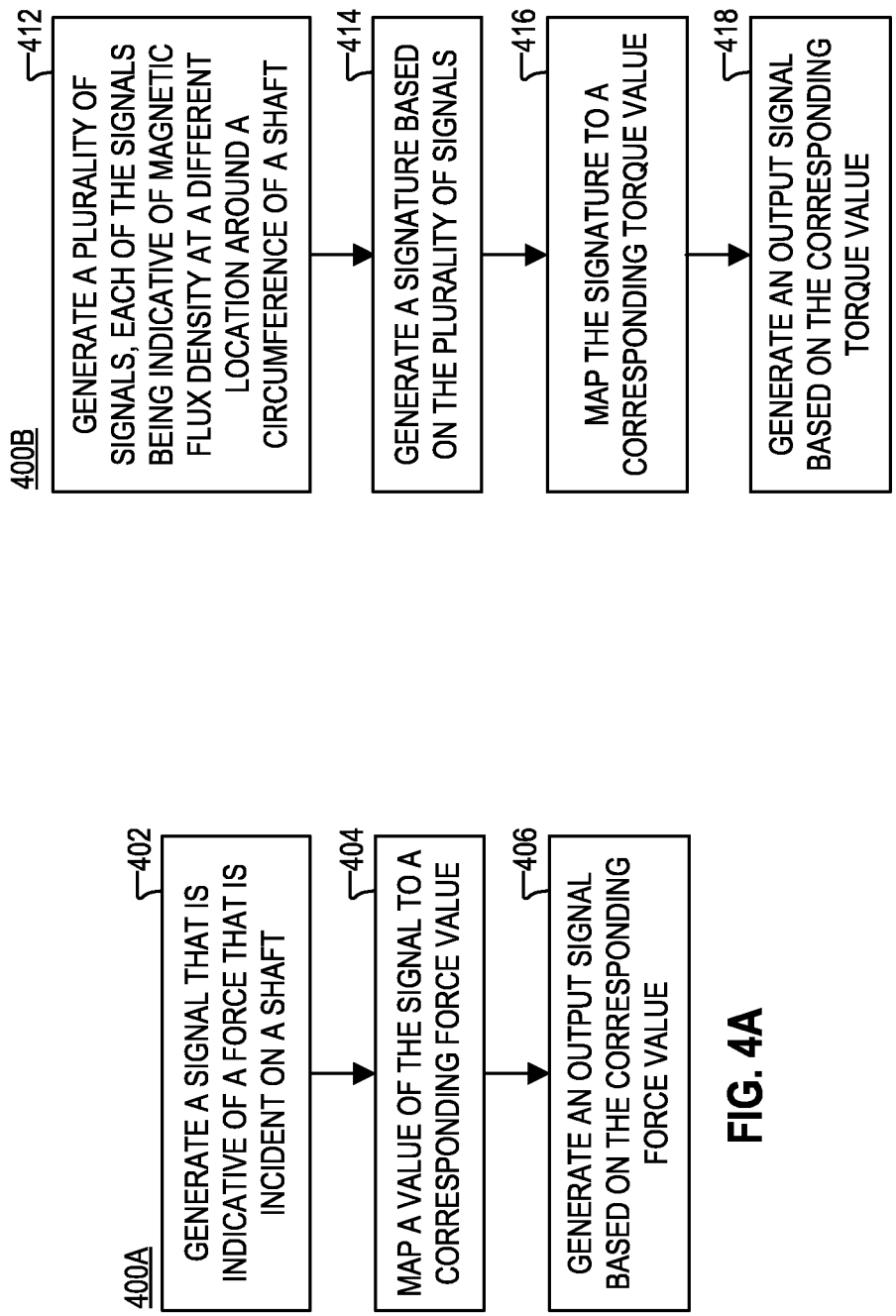

INTEGRATED TORQUE SENSOR BASED ON MAGNETOSTRICTIVE EFFECT

BACKGROUND

Magnetic field sensors that include a magnetic field sensing element, or transducer, such as a Hall Effect element or a magnetoresistive element, are used in a variety of applications to detect aspects of movement of a ferromagnetic article, or target, such as proximity, speed, and direction. Applications using these sensors include, but are not limited to, a magnetic switch or "proximity detector" that senses the proximity of a ferromagnetic article, a proximity detector that senses passing ferromagnetic articles (for example, magnetic domains of a ring magnet or gear teeth), a magnetic field sensor that senses a magnetic field density of a magnetic field, and a current sensor that senses a magnetic field generated by a current flowing in a current conductor. Magnetic field sensors are widely used in automobile control systems, for example, to detect ignition timing from a position of an engine crankshaft and/or camshaft, and to detect a position and/or rotation of an automobile wheel for anti-lock braking systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a sensor is provided, comprising: a supporting member; a permanent magnet that is coupled to the supporting member; and a sensor die having a plurality of sensing elements and processing circuitry formed thereon, the plurality of sensing elements being arranged to generate one or more signals in response to a pattern of magnetic flux density that is produced by the permanent magnet and modulated by an application of force to a shaft, the processing circuitry being configured to map the one or more signals to a value of a force applied to the shaft, and output an indication of the value of the force, wherein the permanent magnet and the sensor die are encapsulated in an encapsulating material, the encapsulating material being used to form a package of the sensor.

According to aspects of the disclosure, a sensor is provided, comprising: a supporting member; a sensor die; a transmitting coil that is formed on the sensor die; a plurality of sensing elements and a processing circuitry that are formed on the sensor die, the plurality of sensing elements being arranged to generate one or more signals in response to a pattern of magnetic flux density that is produced by the transmitting coil and modulated by an application of force to a shaft, the processing circuitry being configured to map the one or more signals to a value of a force applied to the shaft, and output an indication of the value of the force. wherein the supporting member and the sensor die are encapsulated in an encapsulating material, the encapsulating material being used to form a package of the sensor.

According to aspects of the disclosure, a sensor is provided, comprising: a magnetic field source; and a sensor die having a plurality of sensing elements and processing circuitry formed on the sensor die, the plurality of sensing elements being arranged to generate one or more signals in response to a pattern of magnetic flux density that is produced by a magnetic field source and modulated by an application of force to a shaft, the processing circuitry being configured to map the one or more signals to a value of a force applied to the shaft, and output an indication of the value of the force, wherein the magnetic field source and the sensor die are encapsulated in an encapsulating material that is used to form a package of the sensor.

According to aspects of the disclosure, a sensor is provided, comprising: a permanent magnet that is coupled to an external surface of a package of the sensor; a sensor die having a plurality of sensing elements and processing circuitry formed thereon, the plurality of sensing elements being arranged to generate one or more signals in response to a pattern of magnetic flux density that is produced by the permanent magnet and modulated by an application of force to a shaft, the processing circuitry being configured to map the one or more signals to a value of a force applied to the shaft, and output an indication of the value of the force, wherein the sensor die is encapsulated in an encapsulating material, the encapsulating material being used to form the package of the sensor.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 1A is a diagram of an example of a system, according to aspects of the disclosure;

FIG. 1H is a diagram of an example of a system, according to aspects of the disclosure;

FIG. 2A is a diagram of a sensor, according to aspects of the disclosure;

FIG. 2B is a circuit diagram of a sensor, according to aspects of the disclosure;

FIG. 2C shows an example of a table that maps signal values to torque values, according to aspects of the disclosure;

FIG. 3A is a flowchart of an example of a process, according to aspects of the disclosure;

FIG. 3B is a flowchart of an example of a process, according to aspects of the disclosure;

FIG. 4A is a flowchart of an example of a process, according to aspects of the disclosure;

FIG. 4B is a flowchart of an example of a process, according to aspects of the disclosure;

DETAILED DESCRIPTION

Figure 1B:
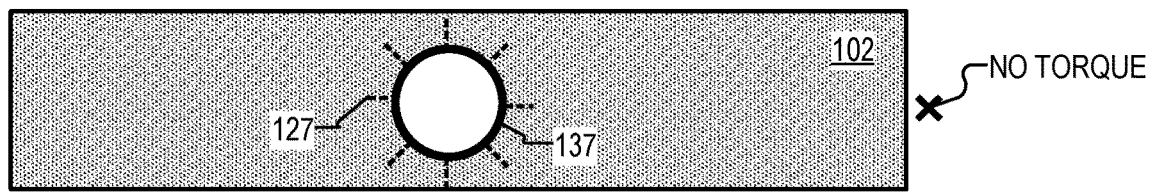
FIG. 1B is a diagram illustrating aspects of the operation of a system, according to aspects of the disclosure.

FIG. 1A is a diagram of a system 100 including a shaft 102 and a sensor 104, which is provided with an in-package permanent magnet 137. Specifically, the permanent magnet 137 may be coupled to a bottom surface of a leadframe 133 via a layer of the adhesive material 135. The leadframe 133 may include a paddle and/or any other suitable type of member. The leadframe 133 may be made of metal, plastic, and/or any other suitable material. On the top surface of the leadframe 133, a layer of dielectric material 147 may be formed. A sensor die 114 may be mounted on the layer of dielectric material 147 by using a layer of adhesive material 131. The sensor die 114 may have one or more magnetic field sensing elements formed thereon, as well as other processing circuitry. The magnetic field sensing elements and/or processing circuitry may be coupled to leadframes 141 and 143 via respective bonding wires. The leadframe 133, the permanent magnet 137, the sensor die 144, and portions of leadframes 141 and 143 may be encapsulated together in molding compound 139 to form a sensor package 145.

In some implementations, the permanent magnet 137 may be formed of ferrite, alnico, and/or any other suitable material. The magnetic field sensing elements may be formed by using lithographic techniques that are customarily used in the manufacturing of semiconductor devices. In one example, the sensing elements may be implemented as giant magnetoresistors (GMRs), tunnel magnetoresistors (TMRs), anisotropic magnetoresistors (AMRs), and/or Hall Plates that are formed on the sensor die 114. In another example, the permanent magnet 137 may be replaced with an transmitting coil that is implemented on the sensor die 114, as shown in the example of FIG. 2D. Although in the example of FIG. 1A, the leadframe 133 is separate of the leadframes 141 and 143, alternative implementations are possible in which the leadframe 133 is integral with one of the leadframes 141 and 143. Although in the example of FIG. 1A, the permanent magnet 137 and the sensor die 114 are disposed on opposite sides of the leadframe 133, alternative implementations in which the permanent magnet 137 and the sensor die 114 are disposed on one side of the leadframe 133. In such implementations, the permanent magnet 137 may be disposed over the leadframe 133 and the sensor die 114 may be disposed over the magnet 137; a layer of dielectric material may be disposed between the magnet 137 and the sensor die 133 to provide electrical isolation.

Examples of different configurations of the sensor 104 are discussed further below with respect to FIGS. 2A-4D.

In operation, the sensor 104 may be configured to measure a torque that is imparted on the shaft 102. According to the present example, the shaft 102 is a steering column. However, the present disclosure is not limited thereto. As illustrated, the shaft 102 may have a first end 111 coupled to the steering rack (not shown) of a vehicle and a second end 113 coupled to the steering wheel of the vehicle (not shown). A torsion bar 115 connects the first and second ends 111 and 113 of the shaft 102. A sheath 121 may surround the torsion bar 115, as shown. The shaft 102 is provided as only one possible example of a shaft that can be monitored with the sensor 104. As used throughout the disclosure, the term "shaft" may refer to a monolithic member (e.g., a rod, etc.), or an assembly including at least two elements that are coupled to one another via a rigid or flexible coupling. In some implementations, at least one of the shaft 102 itself, the sheath 121, or a sleeve 231 (shown in 1H) needs to be made of a ferromagnetic material, ideally one with specific magnetostrictive properties.

In one respect, when torque is applied to the shaft 102, the stress that builds up in the shaft 102 may cause a change in magnetic permeability of a ferromagnetic element flux associated with the shaft 102, which in turn will change the pattern of magnetic flux density around the sensor 104. The sensor 104 may detect the change, and determine the amount of torque that is being imparted on the shaft based on the change.

The shaft 102 may have a longitudinal axis A-A. In embodiments, the longitudinal axis A-A may also be the axis of rotation of the shaft 102. In some implementations, the shaft 102 may have a portion that has a higher (or different) magnetostrictive coefficient than the rest of the shaft 102 (or at least one other portion of the shaft 102). As illustrated in FIG. 1H, in one example, the portion of the shaft 102, which has a higher magnetostrictive coefficient may be a sleeve 231 that is placed over midsection of the shaft. In another example, the portion with a higher magnetostrictive coefficient may be an element of the shaft itself, such as the sheath 121 for example. The portion (or element) that has a higher (or different) magnetostrictive coefficient may also be referred to as "a target." Under the nomenclature of the present disclosure, a target that is placed on (or is otherwise part of) the shaft 102 may be referred to as a part or portion of the shaft 102, irrespective of whether it contributes to the structural strength of the shaft. As is discussed further below with respect to FIG. 1F, the absolute value of the magnetostrictive coefficient of a material is proportional to the magnitude of distortion of magnetic flux density that is caused by the placement of mechanical stress on the material. The relationship between the magnetostrictive coefficient and magnetic flux density is discussed further below with respect to FIG. 1F.

Figure 1C:
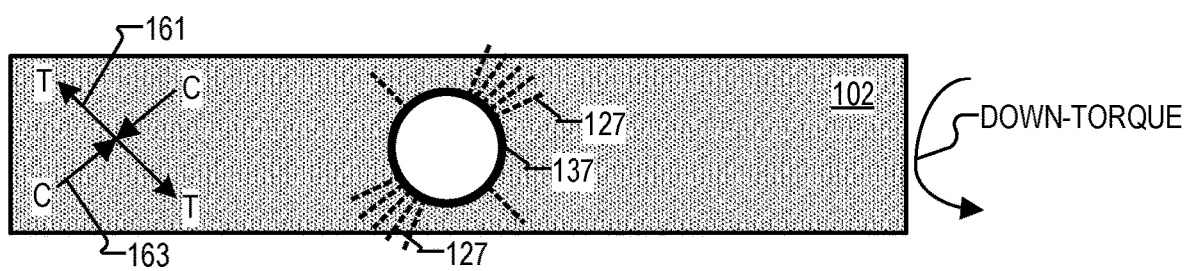
FIG. 1C is a diagram illustrating aspects of the operation of a system, according to aspects of the disclosure.
Figure 1D:
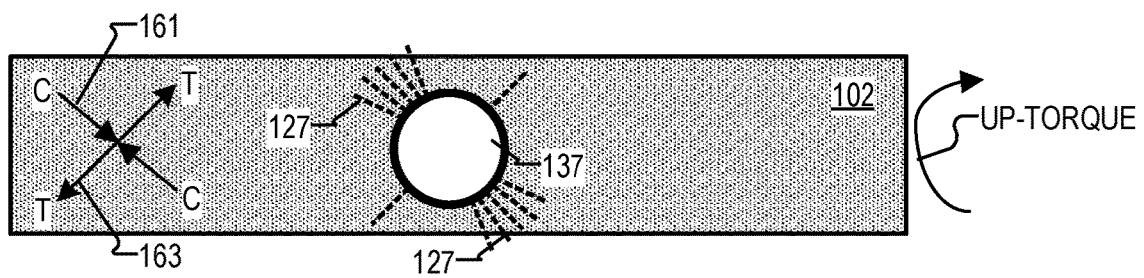
FIG. 1D is a diagram illustrating aspects of the operation of a system, according to aspects of the disclosure.
Figure 2D:
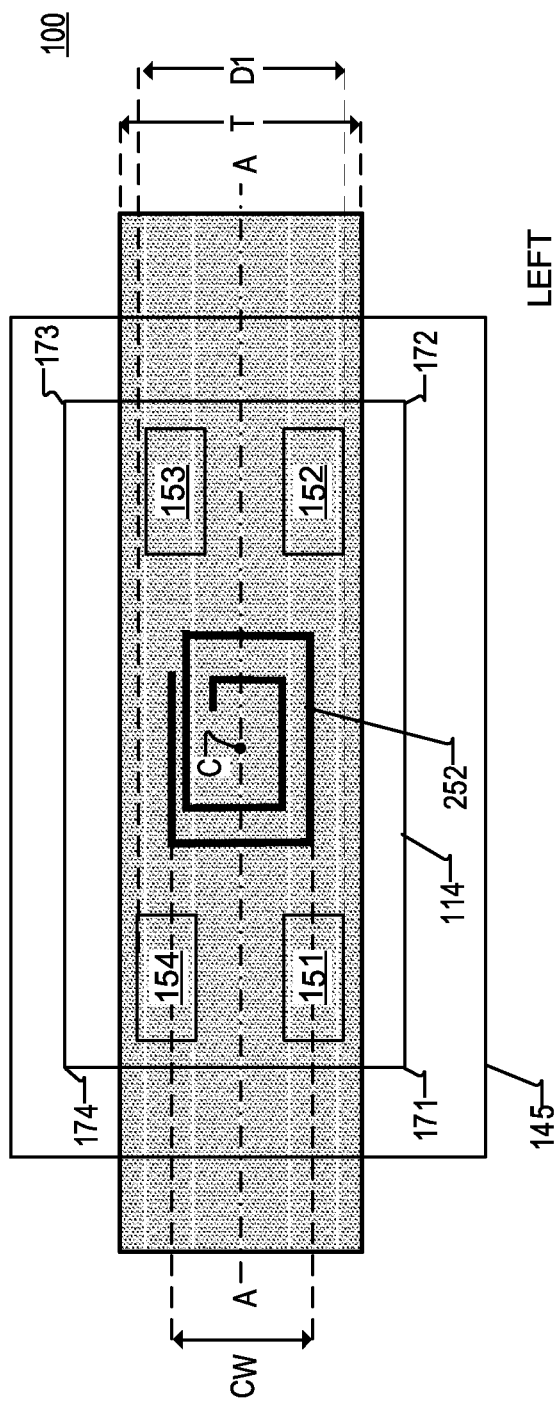
FIG. 2D is a diagram of a sensor, according to aspects of the disclosure.

FIGS. 1B-D provide a side view of the shaft 102, according to aspects of the disclosure. FIGS. 1B-D are provided to illustrate how the placement of a torque on the shaft 102 causes distortions in the magnetic flux density of the magnet 137. The distribution of the magnetic flux density is represented by magnetic field lines 127, which extend outwardly from the magnet 137. FIG. 1B shows the shaft 102 when no torque is applied to the shaft 102. FIG. 1B illustrates that the magnetic flux density may have a uniform distribution around the magnet 127. FIG. 1C shows the shaft 102 when a torque is applied to the shaft 102 in a downward direction. FIG. 1C illustrates that when a downward torque is applied to the shaft 102, the surface of shaft 102 may be subjected to a tensile stress along axis 161 and a compressive stress along axis 163. The appearance of stress in this manner causes the magnetic flux density to be distorted. Specifically, the appearance of stress, causes the magnetic flux density to be greater along axis 163 and smaller along axis 161 or the other way around depending on the sign of the magnetostrictive coefficient of the material of the shaft. FIG. 1D shows the shaft 102 when a torque is applied to the shaft 102 in an upward direction. FIG. 1D illustrates that when an upward torque is applied to the shaft 102, the shaft 102 may be subjected to a tensile stress along axis 163 and a compressive stress along axis 161. The appearance of stress in this manner causes the magnetic flux density to be distorted. Specifically, the appearance of stress, causes the magnetic flux density to be greater along axis 161 and smaller along axis 163 or the other way around depending on the sign of the magnetostrictive coefficient of the material of the shaft.

Figure 1E:
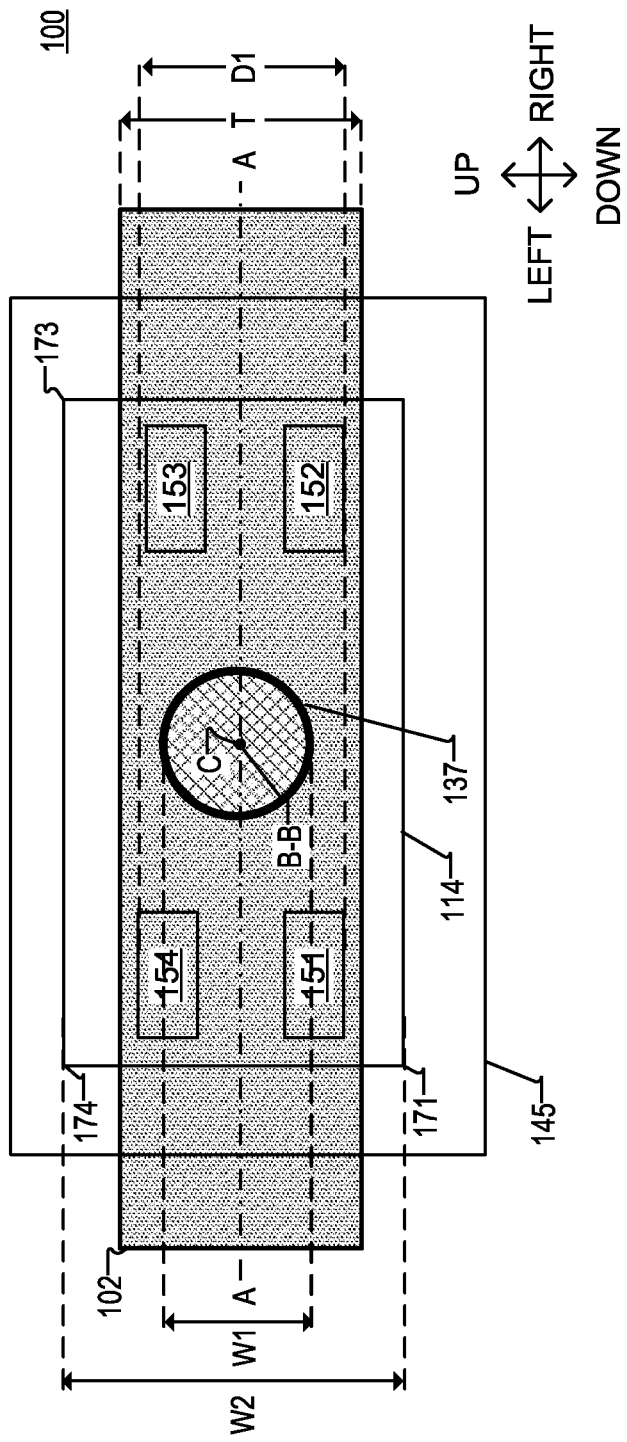
FIG. 1E is a diagram of an example of a system, according to aspects of the disclosure.

FIG. 1E is a side view of the system 100, when viewed from direction D (shown in FIG. 1A). FIG. 1E illustrates that the sensor 100 may be provided with magnetic field sensing elements 151, 152, 153, and 154, which are formed on the sensor die 114. FIG. 1E further illustrates the positioning of the magnet 137 relative to the sensing elements 151-154, in accordance with some implementations. Specifically, in the example of FIG. 1E, the magnet 137 is equidistant from the sensing elements 151, 152, 153, and 154—that is, each of the sensing elements 151, 152, 153, and 154 is spaced apart from the magnet 137 by the same distance. The distance between sensing elements 151 and 154 may be D1, and the distance between sensing elements 152 and 153 may also be D1. As illustrated, in some implementations, the distance D1 may be smaller than the thickness T of the shaft 102. The substrate 114 may have a normal axis B-B that intersects the longitudinal axis A-A of the shaft 102 at a right angle. The axis B-B may extend from the center C of the sensor die 114. The relative sizes of magnet 137, sensor die 114 and shaft might differ from the illustration in FIG. 1E. In some implementations, the sensor die 114 may have a width W2 that is smaller than the thickness T of the shaft 102 and/or the magnet 137 may have a width W1 that is greater than the thickness T of the shaft. Additionally or alternatively, in some implementations, the width W1 of the magnet may be greater than the width W2 of the sensor die 114. Additionally or alternatively, in some implementations, The sensor die 114 could be of similar size or even smaller than the magnet 137 and the shaft 102 could be larger than the die 114.

In some implementations, each of the sensing elements 151, 152, 153, and 154 may be spaced apart from the center C of the sensor die 114 by the same distance. Additionally or alternatively, in some implementations, sensing element 151 may be formed adjacent to corner 171 of the sensor die 114; sensing element 152 may be formed adjacent to corner 172 of the sensor die 114; sensing element 153 may be formed adjacent to corner 173 of the sensor die 114; and sensing element 154 may be formed adjacent to corner 173. In some implementations, the distance between corner 171 and sensing element 151 may be greater than the distance between sensing element 151 and the center C of the sensor die 114 (e.g., 2 times greater, 5 times greater, 10 times greater, etc.). In some implementations, the distance between corner 172 and sensing element 152 may be greater than the distance between sensing element 152 and the center C of the sensor die 114 (e.g., 2 times greater, 5 times greater, 10 times greater, etc.). In some implementations, the distance between corner 173 and sensing element 153 may be greater than the distance between sensing element 153 and the center C of the sensor die 114 (e.g., 2 times greater, 5 times greater, 10 times greater, etc.). In some implementations, the distance between corner 174 and sensing element 154 may be greater than the distance between sensing element 154 and the center C of the sensor die 114 (e.g., 2 times greater, 5 times greater, 10 times greater, etc.). However, it will be understood that FIGS. 1-E are provided as an example only, and the present disclosure is not limited to any specific placement of the sensing elements 151

Figure 1F:
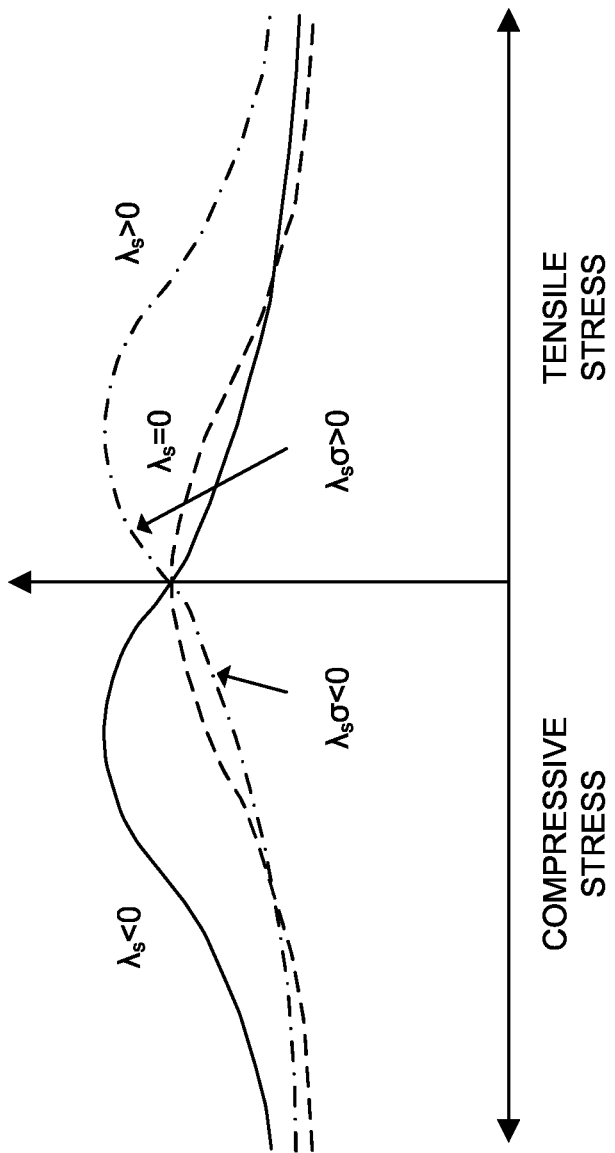
FIG. 1F is a graph illustrating aspects of the magnetostriction effect, according to aspects of the disclosure.

As illustrated by FIGS. 1B-D, magnetostriction involves a change in magnetic flux density under the influence of mechanical stress. Typical stress characteristics of the dependence of magnetic flux density B on the mechanical stress σ are shown in FIG. 1F. Specifically, FIG. 1F shows typical characteristics of dependence of magnetic flux density B on the mechanical stress σ for materials with positive (λs>0), negative (λs<0) and zero (λs=0) saturation magnetostriction coefficient λs. As is known in the art, the character of changes of magnetic flux density B under the influence of mechanical stress σ is determined by the sign of factor λsσ, where λs is a saturation magnetostriction coefficient, which results from the equation:

$$\left(\frac{\partial B}{\partial \sigma}\right)H = \left(\frac{\partial \lambda s}{\partial H}\right)\sigma$$

where H is the magnetizing field (e.g., the magnetic field that is associated with the shaft 102 in the example of FIGS. 1A-D, etc.). For a positive value of λsσ, the magnetic flux density B increases with the increase of applied stress σ. For example, in material with positive saturation magnetostriction λs, the magnetic flux density B will increase for tensile stress σT, which is commonly considered as positive, which is in contrast to the negative compressive stress σC. The same process will occur for material with negative λs under compressive stress σC. When the sign of the factor λsσ is negative, a decrease in value of the magnetic flux density B is observed. Each of the characteristics presented in FIG. 1F exhibits a maximum for a certain value of applied stress σ. The inflection point, where (∂B/∂σ)H=0, is known as Villari reversal point. After reaching this point material reacts for further increase of stress σ like the one with the opposite sign of saturation magnetostriction λs. Further information about magnetostriction can be found in Jackiewicz, Dorota & Kachniarz, Maciej & Bienkowski, Adam. (2017), Investigation of the Magnetoclastic Villari Effect in Steel Truss, which is herein incorporated by reference. In one aspect, FIG. 1F shows changes in magnetic flux density at a particular point adjacent to a magnetostrictive element.

Figure 1G:
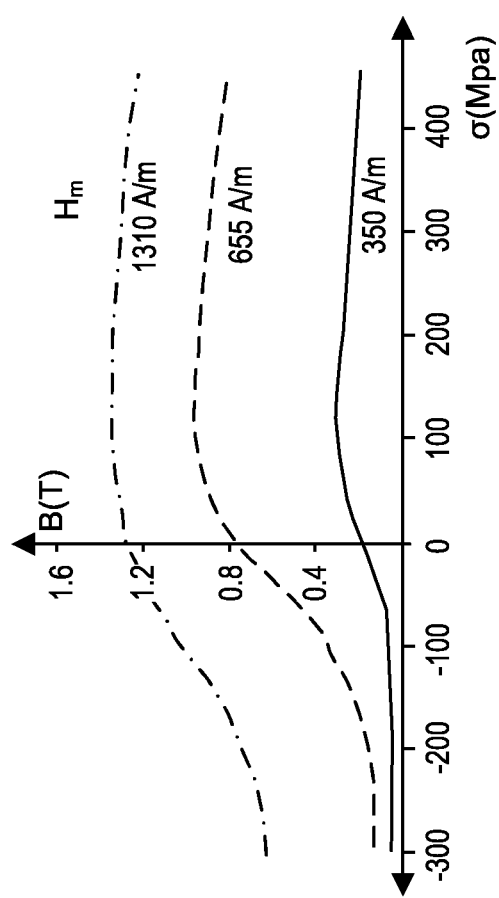
FIG. 1G is a graph illustrating aspects of the magnetostriction effect, according to aspects of the disclosure.

FIG. 1G shows plots of magnetoelastic B(σ)H characteristics that are consistent with a theoretical steel element made of 13CrMo4-5 constructional steel. The 13CrMo4-5 steel is characterized by a positive value of the magnetostriction coefficient (λs=+25 μm/m). FIG. 1G shows the changes in magnetic flux density B(t) as a function of stress σ for different magnitudes of the magnetizing field $H_m$.

FIG. 2A is a diagram of the sensor 104, in accordance with one possible implementation. As illustrated, the sensor 104 may include the sensing elements 151-154 and an electronic circuitry 222. Both the sensing elements 151-154 and the circuitry 222 may be formed on the sensor die 114, as shown. In some implementations, the sensor die 114 may include a silicon die, a sapphire die, a glass die, an FR-4 die, and/or any other suitable type of substrate.

FIG. 2B shows in further detail one possible implementation of the sensor 104. In this implementation, the circuitry 222 may include an amplifier 204, an analog-to-digital-converter 206, a processing circuitry 208, and a memory 210. The processing circuitry 208 may include a general-purpose processor, a special-purpose processor, a CORDIC processor, an arithmetic-and-logic circuit, and/or any other suitable type of processing circuitry. The memory 210 may be operatively coupled to the processing circuitry 208. The memory 210 may include any suitable type of volatile or non-volatile memory, such as Electrically Erasable Programmable Read Only Memory (EEPROM) or Dynamic Random Access Memory (DRAM).

In the example of FIG. 2B, the sensing elements 151-154 may be implemented as giant magnetoresistors (GMRs) or tunnel magnetoresistors (TMRs), and they may be arranged in a bridge circuit 202, as shown. The bridge circuit 202 may be configured to output a signal S. The sign of signal S (e.g., a positive sign or a negative sign) may be indicative of the direction of the torque that is being applied on the shaft 102, and the magnitude of signal S may be indicative of the amount magnitude of the torque.

The memory 210 may be configured to store a table 212 (shown in FIG. 2C). Table 212 may include a plurality of rows 214. Each row 214 may be arranged to map a value for the signal S to a respective torque value. Although in the example of FIG. 2C the mappings between values for signal S and corresponding torque values are implemented by using a table, it will be understood that any other suitable type of data structure (or a plurality of data structures) can be used to implement the mappings. For example, in some implementations, a search tree can be used instead of a table.

In operation, the bridge circuit 202 may generate a signal S and provide the signal S to the amplifier 204. The amplifier 204 may amplify the signal S and provide the amplified signal S to the ADC 206. The ADC 206 may digitize the signal S and provide the digitized signal S to the processing circuitry 208. The processing circuitry 208 may then use the table 212 to map the value of the signal S (at any particular time instant) to a corresponding torque value. The processing circuitry 208 may then generate an output signal OUT based on the torque value. The signal OUT may be provided to another electronic circuit (not shown) that is also formed on the sensor die 114. Additionally or alternatively, the signal OUT may be provided to an external device. The signal OUT may be any suitable type of analog or digital signal that is at least in part indicative of the torque that is incident on the shaft 102 and/or the torque value that is determined based on the table 212.

Figure 2E:
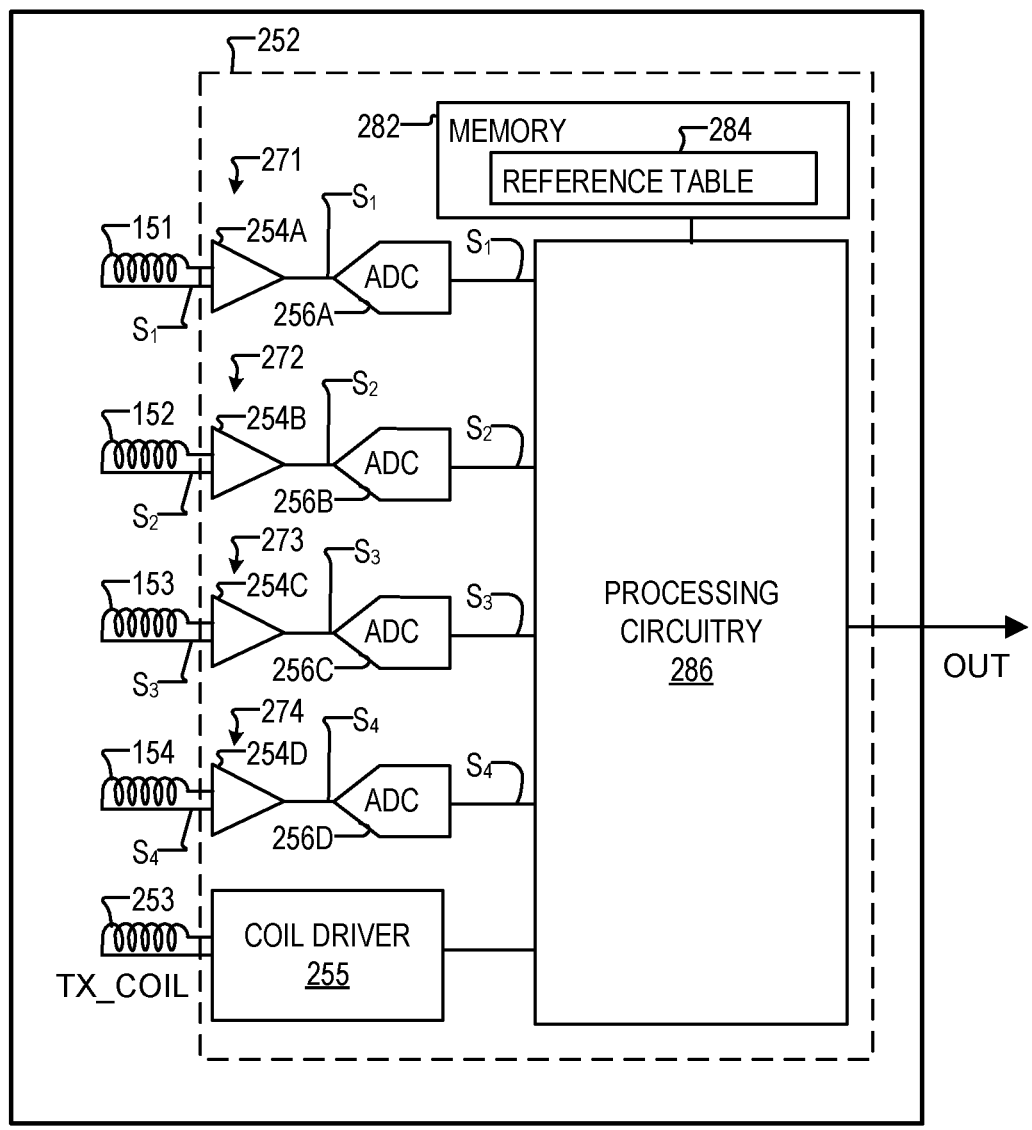
FIG. 2E is a circuit diagram of a sensor, according to aspects of the disclosure.

In the example of FIG. 2B, the magnetic field source is a permanent magnet, which generates a constant magnetic field. In this regard, the signal from the sensing elements 151-154 may be measured at any time. This is in contrast to the example of FIG. 2E in which the magnetic field source is a transmission coil, which generates an alternating magnetic field. In the example of FIG. 2E, the signals from sensing elements 151-154 would need to be measured across one full cycle of the magnetic field so that the minima and maxima of the signals can be evaluated.

FIG. 2B provides an example of one possible sensor architecture for determining the torque that is incident on the shaft. Although not shown in FIG. 2B, in some implementations, the circuitry 222 may be arranged to perform, on the signal S, stress compensation, temperature compensation, and/or any other suitable type of compensation. Although in the example of FIG. 2B, the sensing elements 151-154 are GMRs or TMRs, it will be understood that the disclosure is not limited to any specific type of magnetic field sensing element being used to form the bridge circuit 202.

In the example of FIGS. 2A-C, the sensor 104 uses a look-up table to map the output of the sensing bridge 202 (i.e., the signal S) to a corresponding torque value. However, in some implementations, the look-up table may be omitted, and the mapping may be performed in a different manner. Specifically, in a preferred embodiment, the torque that is incident on the shaft 102 may be linearly correlated to the signal S, and the mapping between the value of the signal S and the torque value may be performed by evaluating a function F(S), or another function, which models the torque value as function of the value of the signal S. In some implementations, the function F(S) might take into account a signal offset S_off that is subtracted from the signal S and a coefficient C that describes the linear correlation of a change of signal to a change of torque. The function would than read F(S)=C*(S−S_off) with F as a measure of the torque that is incident on the shaft 102. In this regard, it will be understood that the table 212 is provided only as an example to illustrate the relationship between the value of the signal S and the value of the torque that is being applied to the shaft 104.

FIG. 2D is a side view of the system 100, when viewed from direction D (shown in FIG. 1A). FIG. 2D shows the sensor 104 in accordance with another implementation. In this implementation, the permanent magnet 137 is replaced with an on-die transmitting coil 252. The transmitting coil 252 may include a conductive trace that is formed on the sensor die 114, as shown. The transmitting coil 252 may be formed on the same surface of the sensor die 114 as the sensing elements 151, 152, 153, and 154. In some implementations, the transmitting coil 252 may be equidistant from the sensing elements 151, 152, 153, and 154. The distance between sensing element 151 and 154 may be D1, and the distance between sensing elements 152 and 153 may also be D1. As illustrated, in some implementations, the distance D1 may be smaller than the thickness T of the shaft 102. The distance D1 may also be smaller than the width CW of the transmitting coil C. The substrate 114 may have a normal axis B-B that intersects the longitudinal axis A-A of the shaft 102. The axis B-B may extend from the center C of the sensor die 114. According to one particular example, the implementation of the sensor 104 that is shown in FIG. 2D may be identical to the implementations of the sensor that is discussed in FIG. 1E, but for including an on-die transmitting coil rather than an in-package permanent magnet. According to another example, each of the sensing elements 151, 152, 153, and 154 may be implemented as a receiving coil, rather than a magnetoresistor or a fluxgate.

FIG. 2E is a circuit diagram of an implementation of the sensor 104 in which the sensor 104 is provided with the receiving coil 252, and in which the sensing elements 151-154 are implemented as receiving coils. Each receiving coil may also be implemented as a conductive trace that is etched on the sensor die 114. However, it will be understood that the present disclosure is not limited to any specific type of magnetic field sensing element being used in the design that is shown in FIG. 2D. For example, in some implementations, any of the sensing elements 151-154 may include a GMR, a TMR, a Hall Plate, and/or any other type of magnetic field sensing element.

As illustrated in FIG. 2E, the sensor 104 may include electronic circuitry 252. The electronic circuitry 252 may include signal paths 271-274, a coil driver 255, a memory 282, and a processing circuitry 286. The processing circuitry 286 may include a general-purpose processor, a special-purpose processor, a CORDIC processor, an arithmetic-and-logic circuit, and/or any other suitable type of processing circuitry. The memory 282 may be operatively coupled to the processing circuitry. The memory 282 may include any suitable type of volatile or non-volatile memory, such as Electrically Erasable Programmable Read Only Memory (EEPROM) or Dynamic Random Access Memory (DRAM).

Figure 2F:
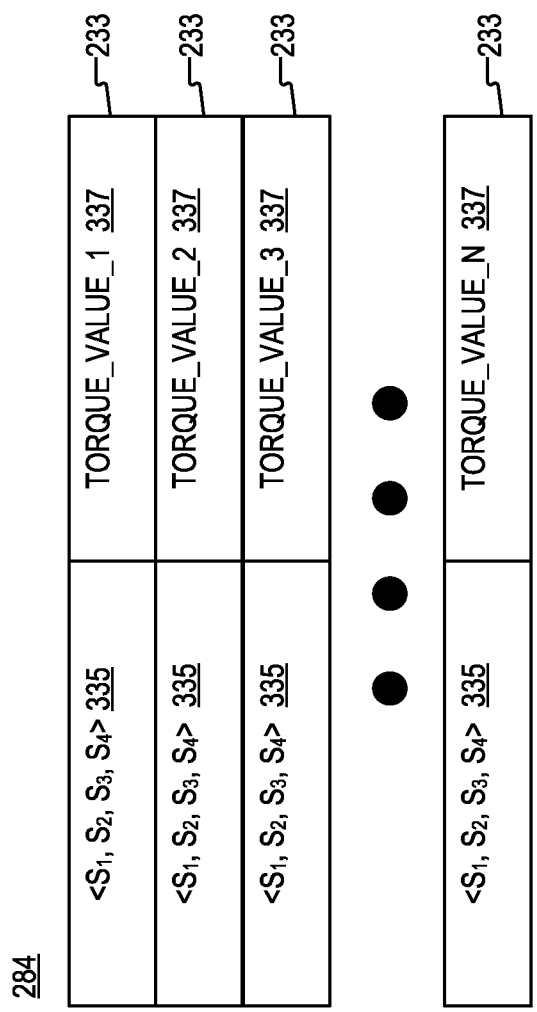
FIG. 2F shows an example of a table that maps signal values to torque values, according to aspects of the disclosure.

The memory 282 may be configured to store a reference table 284. An example of one possible implementation of the reference table 284 is shown in FIG. 2F. As illustrated, the table 284 may include a plurality of rows 233. Each row 233 may map a different respective signature 335 to a corresponding torque value 337. The signature 335 in each row 233 may be different from the signatures 335 in any of the remaining rows 233. Each of the signatures 335 may include: (i) the respective value of a signal S1 (generated by sensing element 151), (ii) the respective value of a signal S2 (generated by sensing element 152), (iii) the respective value of a signal S3 (generated by sensing element 153), and (iv) the respective value of a signal S4 (generated by sensing element 154). The signal values in each of the signatures 335 may be values that are sampled at approximately the same time (e.g., within 1 ms or 0.01 ms, etc.). Together, the signal values in each of the signatures 335 may represent the pattern of magnetic flux density on the side of the shaft 102 (e.g., see FIGS. 1B-D).

Although in the example of FIG. 2F the mappings between the signatures 335 and corresponding torque values are implemented by using a table, it will be understood that any other suitable type of data structure (or a plurality of data structures) can be used to implement the mappings. For example, in some implementations, a search tree can be used instead of a table.

Although in the example of FIGS. 2D-F, each signature 335 includes four signal values, alternative implementations are possible in which each of the signatures 335 includes a different number of values such as 2 values, 3 values, 5 values, 6, values, etc. In such alternative implementations, the number of sensing elements (and signal paths) in sensor 104 may be increased or reduced as needed. Stated succinctly the present disclosure is not limited to using any specific number of sensing elements, in the sensor 104, to sense the pattern of distortion of the magnetic flux density around the shaft 102 when torque is applied to shaft 102.

Returning to FIG. 2E, in operation, the processing circuitry may cause the coil driver 255 to drive the transmitting coil 253 with an alternating current. The coil driver 255 may cause the transmitting coil 253 to produce an alternating magnetic field. The magnetic flux density that is produced by the transmitting coil 253 is attracted by the ferromagnetic material of the shaft and will magnetize adjacent areas of the shaft partially or fully. The distribution of magnetic flux lines around the sensor and the shaft depends to some extent on the magnetic properties of the shaft. The magnetic properties of the shaft may be modulated by torque (or another force) that is being applied on the shaft 102. Therefore, the magnetic flux density pattern can change in a reaction to the torque. The sensing elements 151, 152, 153, and 153 may be used to detect the pattern of the magnetic flux density of the transmitting coil 253, and the values of signals S1, S2, S3, and S4 (which are generated by sensing elements 151-154) may be used to determine the magnitude of the torque (or another force that is being applied on the shaft 253.

The signal path 271 may include an amplifier 254A and an ADC 256A. The sensing element 151 may generate a signal $S_1$ in response to the modulated magnetic field. The sensing element 151 may provide the signal $S_1$ to the amplifier 254A. The amplifier 254A may amplify the signal $S_1$ to produce an amplified signal $S_1$. The ADC 256A may digitize the signal $S_1$ and provide the digitized signal $S_1$ to the processing circuitry 286.

The signal path 272 may include an amplifier 254B and an ADC 256B. The sensing element 152 may generate a signal $S_2$ in response to the reflected magnetic field. The sensing element 152 may provide the signal $S_2$ to the amplifier 254B. The amplifier 254B may amplify the signal $S_2$ to produce an amplified signal $S_2$. The ADC 256B may digitize the signal $S_2$ and provide the digitized signal $S_2$ to the processing circuitry 286.

The signal path 273 may include an amplifier 254C and an ADC 256C. The sensing element 153 may generate a signal $S_3$ in response to the reflected magnetic field. The sensing element 153 may provide the signal $S_3$ to the amplifier 254C. The amplifier 254C may amplify the signal $S_3$ to produce an amplified signal $S_3$. The ADC 256C may digitize the signal $S_3$ and provide the digitized signal $S_3$ to the processing circuitry 286.

The signal path 274 may include an amplifier 254D and an ADC 256D. The sensing element 154 may generate a signal $S_4$ in response to the reflected magnetic field. The sensing element 154 may provide the signal $S_4$ to the amplifier 254D. The amplifier 254D may amplify the signal $S_4$ to produce an amplified signal $S_4$. The ADC 256D may digitize the signal $S_4$ and provide the digitized samples to the processing circuitry 286.

The processing circuitry 286 may be configured to obtain a respective sample of each of the digitized signals $S_1$, $S_2$, $S_3$, and $S_4$. As noted above, the obtained sample values may be generated at approximately the same time. The processing circuitry 286 may then combine the samples of signals $S_1$, $S_2$, $S_3$, and $S_4$ to generate a signature. Next, the processing circuitry 286 may identify one of the signatures 335, in the table 284, that matches the generated signature. Next, the processing circuitry 286 may identify the row 233 in the table 284 which contains the signature 335 which matches the generated signature. Next, the processing circuitry 286 may retrieve the torque value 337 that is part of the identified row. And finally, the processing circuitry 286 may generate an output signal OUT based on the identified torque value. The signal OUT may be provided to another electronic circuit (not shown) that is also formed on the sensor die 114. Additionally or alternatively, the signal OUT may be provided to an external device. The signal OUT may be any suitable type of analog or digital signal that is at least in part indicative of the torque that is incident on the shaft 102.

FIG. 2E provides an example of one possible sensor architecture that is arranged to determine the torque that is incident on a shaft by mapping possible values for signals that are output by four sensing elements to corresponding torque values. Although not shown in FIG. 2E, in some implementations, the circuitry 252 may be arranged to perform, on the signals S1-S4, stress compensation, temperature compensation, and/or any other suitable type of compensation.

In the example of FIGS. 2D-E, the sensor 104 uses a look-up table to map the outputs of sensing elements 151-154 (i.e., the signals $S_1$, $S_2$, $S_3$, and $S_4$) to a corresponding torque value. However, in some implementations, the look-up table may be omitted, and the mapping may be performed in a different manner. Specifically, in a preferred embodiment, the torque that is incident on the shaft 102 may be linearly correlated to the signals S1, S2, S3, and S4, and the mapping between the values of signals S1, S2, S3, and S4 and the torque value may be performed by evaluating a function F(S1, S2, S3, S4), or another function, which models the torque value as function of the values of signals S1, S2, S3, and S4. In some respects, FIGS. 1B-1D shows that the signals of S1 and S3 may increase under a certain torque applied to the shaft while signals S2 and S4 decrease under the same torque. It can help to suppress certain errors of the measurement to calculate the differences of signals S1 and S3 to S2 and S4. Each of the signals can have a signal offset S_off1 to S_off4 as a result of tolerances in the sensor production. A possible implementation of function F(S1, S2, S3, S4) might therefore read: F(S1, S2, S3, S4)=C*[(S1−S_off1)−(S2−S_off2)+(S3−S_off3)−(S4−S_off4)]. The coefficient C describes the relation of the change in signal to the change in torque applied to the shaft. In this regard, it will be understood that the table 284 is provided only as an example to illustrate the relationship between the values of the signals S1, S2, S3, and S4 and the value of the torque that is being applied to the shaft 104.

FIG. 3A is a flowchart of an example of a process 300A that is performed by the implementation of the sensor 104 which is shown in FIGS. 2A-C. At step 302, the bridge circuit 202 (shown in FIG. 2B) generates a signal that is indicative of a pattern of magnetic flux density on the side of the shaft 102. The generated signal may be the same or similar to the signal S that is discussed above with respect to FIG. 2B. For example, when the pattern of magnetic flux density is uniform, as illustrated in FIG. 1B, the signal may have a first value. As another example, when the pattern of magnetic flux density is more concentrated in one direction, as shown in FIG. 1C, the signal may have a second value. As yet another example, when the pattern of magnetic flux density is more concentrated in a different direction, as illustrated in FIG. 1D, the signal S may have a third value. At step 304, the processing circuitry 208 maps the signal value (generated at step 302) to a corresponding torque value. The corresponding torque value may identify the magnitude and/or direction of the torque that is currently being applied on the shaft 102. The mapping may be performed in the manner discussed above—e.g., by using the reference table 212 or by using the processing circuitry 208 to evaluate the function F(S) or another analytical model that maps the value of the signal S to a corresponding torque value. The output signal may be the same or similar to the signal OUT, which is discussed above with respect to FIGS. 2A-C.

FIG. 3B is a flowchart of an example of a process 300B that is performed by the implementation of the sensor 104 which is shown in FIGS. 2D-E. At step 312, a plurality of signals is generated, where each of the signals is indicative of magnetic flux density on the side of the shaft 102. In some implementations, the generated signals may be the same or similar to the signals S1, S2, S3, and S4, which are discussed above with respect to FIGS. 2D-F. As discussed above, each of the signals may be generated by a different one of the sensing elements in the sensor 104 (e.g., the sensing elements 151-154) in response to a magnetic field that is associated with the shaft 102. At step 314, a signature is produced based on the signals (generated at step 302). In some implementations, the signature may include a vector in which each element is the value of a different one of the signals (generated at step 312). At step 316, the signature is mapped to a corresponding torque value. The corresponding torque value may identify the magnitude and/or direction of the torque that is currently being applied on the shaft 102. The mapping may be performed in the manner discussed above—e.g., by using the reference table 212 or by using the processing circuitry 208 to evaluate the function F(S1, S2, S3, S4) or another analytical model that maps the values of the signal S1, S2, S3, and S4 to a corresponding torque value. The output signal may be the same or similar to the signal OUT, which is discussed above with respect to FIGS. 2A-C. The output signal may be the same or similar to the signal OUT, which is discussed above with respect to FIGS. 2D-E.

Figures 4C, 4D:
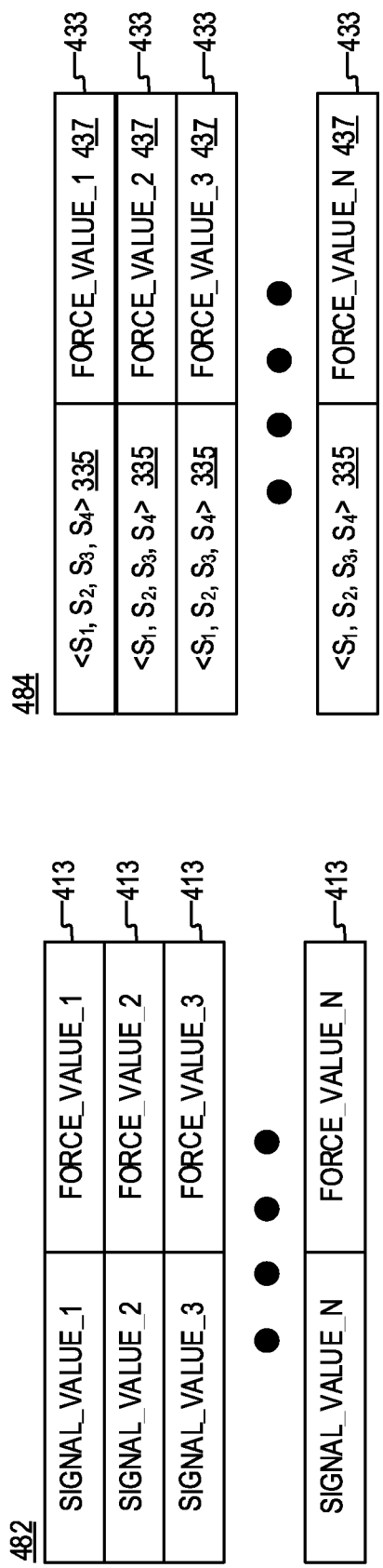
FIG. 4C shows an example of a table that maps signal values to force values, according to aspects of the disclosure.
FIG. 4D shows an example of a table that maps signal values to force values, according to aspects of the disclosure.

FIG. 4A is a flowchart of an example of a process 400A that is performed by the implementation of the sensor 104 that is shown in FIGS. 2A-C. At step 402, the bridge circuit 202 (shown in FIG. 2B) generates a signal that is indicative of the magnetic flux density on the side of the shaft 102 (e.g., see FIGS. 4A-B). The generated signal may be the same or similar to the signal S that is discussed above with respect to FIG. 2B. At step 404, the processing circuitry 208 uses a table 482 (shown in FIG. 4C) to map the signal value (generated at step 402) to a corresponding force value (e.g., a bending force value, a compressive force value, or a tensile force value). At step 406, processing circuitry 208 generates an output signal based on the force value. In some implementations, the output signal may be any signal that encodes or is otherwise, at least in part, indicative of the force value (identified at step 404). The output signal may be the same or similar to the signal OUT, which is discussed above with respect to FIG. 2E.

FIG. 4B is a flowchart of an example of a process 400B that is performed by the implementation of the sensor 104 that is shown in FIGS. 2D-E. At step 412, a plurality of signals is generated, where each of the signals is indicative of magnetic flux density on the side of the shaft 102. At step 414, a signature is produced based on the signals (generated at step 402). In some implementations, the signature may include a vector in which each element is the value of a different one of the signals (generated at step 412). At step 416, the processing circuitry 286 uses a table 484 (shown in FIG. 4D) to map the signature to a corresponding force value (e.g., a bending force value, a compressive force value, or a tensile force value). At step 418, processing circuitry 286 generates an output signal based on the force value. In some implementations, the output signal may be any signal that encodes or is otherwise, at least in part, indicative of the force value (identified at step 414). The output signal may be the same or similar to the signal OUT, which is discussed above with respect to FIG. 2E.

FIG. 4C is a diagram of an example of a reference table 482 that can be used by the sensor 104 when the sensor 104 is desired to measure torque, compressive, tensile, and/or bending force. The table 482 can be used in the implementation of the sensor 104 which is shown in FIGS. 2A-C. The table 482 can be used to replace the table 212 (shown in FIG. 2C), and it can be stored in the memory 210 (shown in FIG. 2B) of the sensor 104. As illustrated, the table 482 may include a plurality of rows 413, and each of the rows 413 may map a different value of the signal that is output from the bridge circuit 202 (shown in FIG. 2B) to a corresponding force value (e.g., a bending force value, a compressive force value, or a tensile force value).

In the example of FIGS. 4A and 4C, the sensor 104 uses a look-up table to map the output of the sensing bridge 202 (i.e., the signal S) to a corresponding force value. However, in some implementations, the look-up table may be omitted, and the mapping may be performed in a different manner. Specifically, in a preferred embodiment, the force that is incident on the shaft 102 may be linearly correlated to the signal S, and the mapping between the value of the signa S and the torque value may be performed by evaluating a function FF(S), or another function, which models the torque value as function of the value of the signal S. In this regard, it will be understood that the table 482 is provided only as an example to illustrate the relationship between the value of the signal S and the value of the force that is being applied on the shaft 104. In some implementations, the sensing elements 151-154 may be positioned in the manner shown in FIG. 4E. In such implementations, the function FF(S) may be the same or similar to the function F(S), which is discussed above, with respect to FIG. 3A.

Figure 4E:
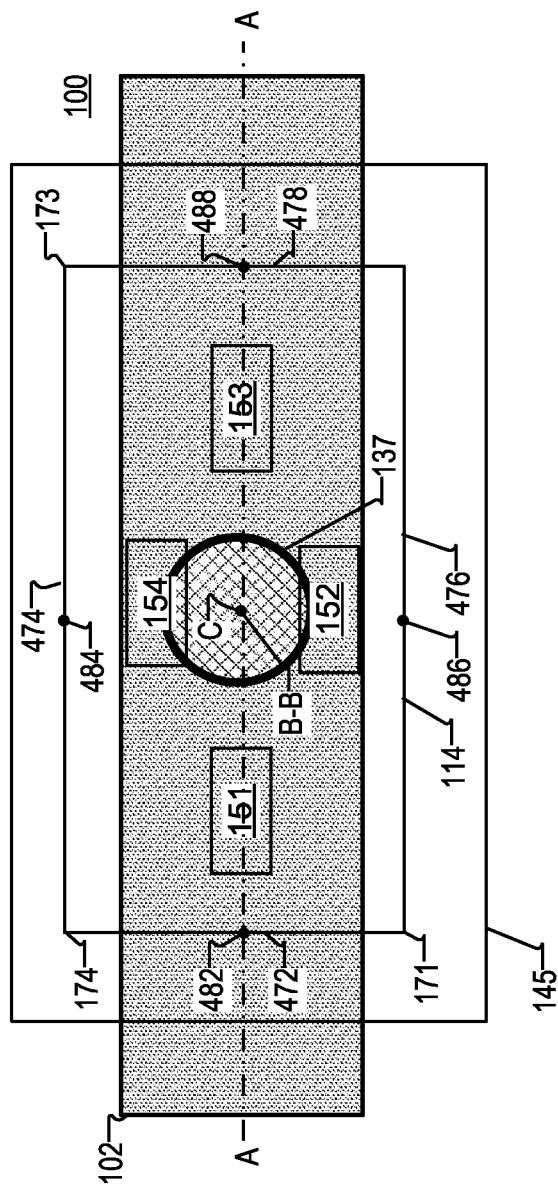
FIG. 4E is a diagram of an example of a system, according to aspects of the disclosure.

In the example of FIGS. 1E and 4E, edges 476 and 474 of the sensor die 114 are substantially parallel to the longitudinal axis A-A of shaft 102, whereas edges 472 and 478 are substantially perpendicular to the longitudinal axis A-A. As used herein, the phrase "substantially perpendicular" shall mean "within +/−10 degrees of being exactly perpendicular". In the example of FIG. 4E, each of the sensing elements 151-154 is disposed adjacent to the middle of a respective one of the edges of the sensor die 114. Specifically, sensing element 151 is disposed adjacent to the middle 482 of edge 472, sensing element 152 is disposed adjacent to the middle 486 of edge 476, sensing element 153 is disposed adjacent to the middle 488 of edge 478, and sensing element 154 is disposed adjacent to the middle 484 of edge 474. This is in contrast to the arrangement shown in FIG. 1E in which each of the sensing elements 151-154 is disposed adjacent to a different one of the edges of the sensor die. Under the nomenclature of the present disclosure, a sensing element is disposed adjacent to the middle of an edge of the sensor die 114 if the sensing element is closer to the middle of the edge than any of the corners adjoining the edge. Under the nomenclature of the present disclosure, a sensing element is disposed adjacent to a corner of the sensor die 114 if the sensing element is closer to the corner than the middle of any of the edges that form the corner.

FIG. 4D is a diagram of an example of a reference table 484 that can be used by the sensor 104 when the sensor 104 is desired to measure torque, compressive, tensile, and/or bending force. The table 412 can be used in the implementation of the sensor 104 which is shown in FIG. 2E. The table 484 can be used to replace the table 284 (shown in FIG. 2F), and it can be stored in the memory 282 (shown in FIG. 2E) of the sensor 104. As illustrated, the table 484 may include a plurality of rows 433, and each of the rows 433 may map a different signature 335 to a corresponding force value 437. Each signature 335 may include respective values for the signals S1, S2, S3, and S4 which are sampled at substantially the same time.

In the example of FIGS. 4B and 4D, the sensor 104 uses a look-up table to map the outputs of sensing elements 151-154 (i.e., the signals $S_1$, $S_2$, $S_3$, and $S_4$) to a corresponding torque value. However, in some implementations, the look-up table may be omitted, and the mapping may be performed in a different manner. Specifically, in a preferred embodiment, the torque that is incident on the shaft 102 may be linearly correlated to the signals S1, S2, S3, and S4, and the mapping between the values of signals S1, S2, S3, and S4 and the torque value may be performed by evaluating a function FF(S1, S2, S3, S4), or another function, which models the torque value as function of the values of signals S1, S2, S3, and S4. In this regard, it will be understood that the look-up table 484 is provided as an example only to illustrate the relationship between the values of the signals S1, S2, S3, and S4 and the force that is being applied to the shaft 104. In some implementations, the sensing elements 151-154 may be positioned in the manner shown in FIG. 4E. In such implementations, the function FF(S1, S2, S3, S4) may be the same or similar to the function F(S1, S2, S3, S4), which is discussed above, with respect to FIG. 3B.

Figure 5A:
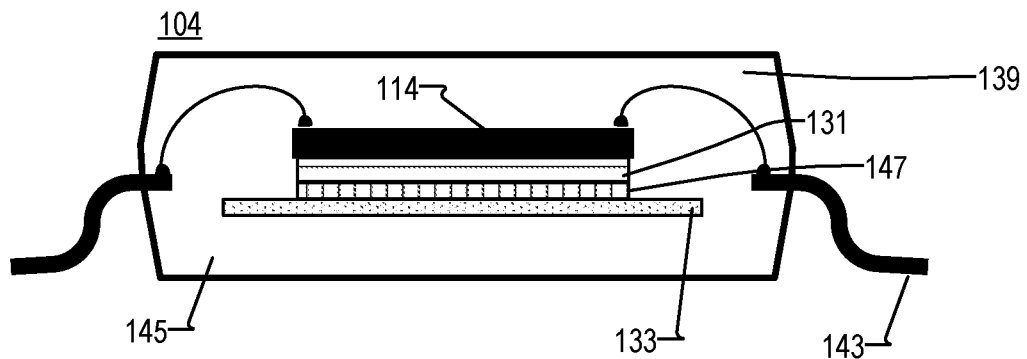
FIG. 5A shows an example of a sensor, according to aspects of the disclosure.

FIG. 5A is a diagram of the sensor 104, in accordance with one possible implementation. In the example of FIG. 5A, the leadframe 133 is magnetized and used as a magnetic field source for the sensor 104. In the example of FIG. 5A, the permanent magnet 137 is omitted.

Figure 5B:
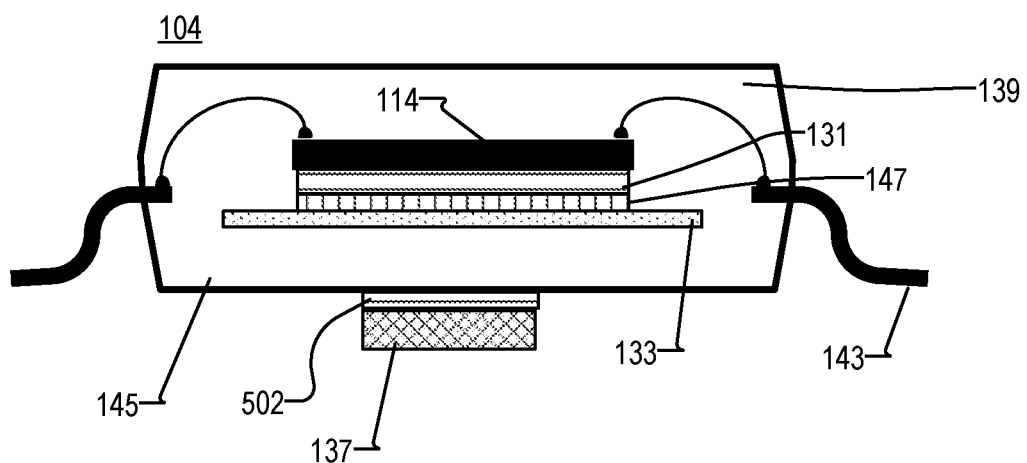
FIG. 5B shows an example of a sensor, according to aspects of the disclosure.

FIG. 5B is a diagram of the sensor 104, in accordance with one possible implementation. In the example of FIG. 5B, the permanent magnet 137 is coupled to an external surface of the sensor package 145 via a layer of adhesive material 502. Although in the example of FIG. 5B the magnet 137 is mounted on the bottom surface of the sensor package 145, alternative implementations are possible in which the magnet 137 is mounted on the top surface of the sensor package 145 and/or any other suitable surface of the sensor package 145.

Figure 5C:
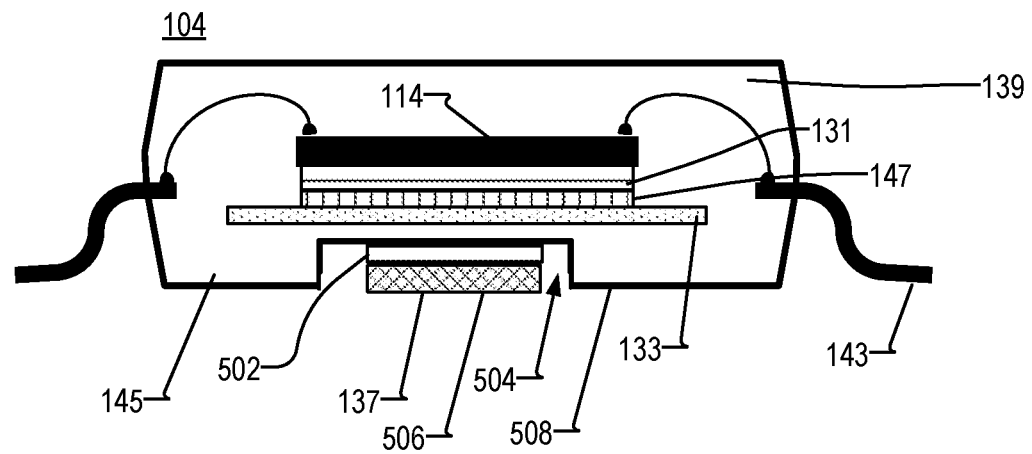
FIG. 5C shows an example of a sensor, according to aspects of the disclosure.

FIG. 5C is a diagram of the sensor 104, in accordance with another possible implementation. In the example of FIG. 5C, the permanent magnet 104 is disposed inside a recess 504 that is formed in the outer (bottom) surface 508 of the sensor package 137. In some implementations, the outer surface 506 of the permanent magnet 137 may be flush with the outer (bottom) surface 508 of the sensor package 145 to make it easier to mount the sensor 104 on a circuit board.

Figure 6:
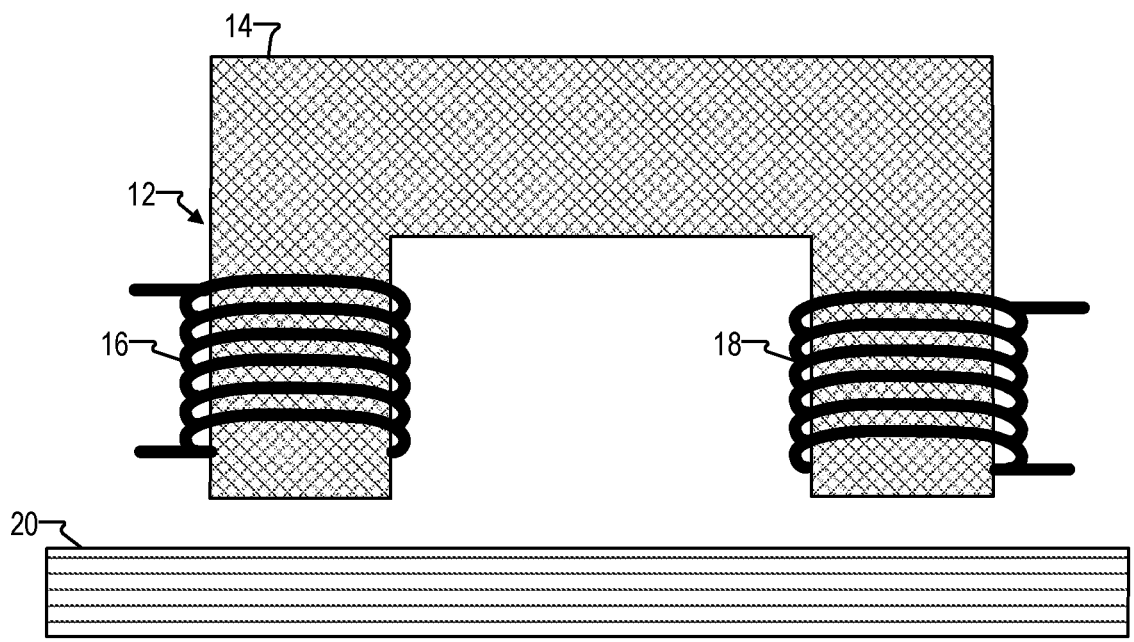
FIG. 6 shows an example of a sensor, according to the prior art.

FIG. 6 is a diagram of a magnetostrictive sensor 12, according to the prior art. As illustrated, the sensor 12 may include a C-shaped core 14 having an transmitting coil 16 formed on one end of the core 14 and a receiving coil 18 on the other end of the core. The sensor 12 may be used to detect the torque that is imparted on a shaft 20. In operation, the sensor 12 may be disposed adjacent to the shaft 20, as shown.

It will be appreciated by those of ordinary skill in the art that while a substrate (e.g., a semiconductor substrate) is described as "supporting" the magnetic field sensing element, the element may be disposed "over" or "on" the active semiconductor surface, or may be formed "in" or "as part of" the semiconductor substrate, depending upon the type of magnetic field sensing element. For simplicity of explanation, while the embodiments described herein may utilize any suitable type of magnetic field sensing elements, such elements will be described here as being supported by the substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor may be used in combination with a back-biased or other magnet, and a magnetic field sensor that senses a magnetic field density of a magnetic field.

As used herein, the term "target" is used to describe an object to be sensed or detected by a magnetic field sensor or magnetic field sensing element. A target may be ferromagnetic or magnetic.

According to the present disclosure, a magnetic field sensing element can include one or more magnetic field sensing elements, such as Hall effect elements, magnetoresistance elements, or magnetoresistors, or coils, and can include one or more such elements of the same or different types. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. As used throughout the disclosure, the term "processing circuitry" may refer to analog circuitry, digital circuitry, or a combination of digital and analog circuitry.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A sensor, comprising:
a supporting member;
a permanent magnet that is coupled to the supporting member; and
a sensor die having a plurality of sensing elements and processing circuitry formed thereon, the plurality of sensing elements being arranged to generate signal in response to a pattern of magnetic flux density that is produced by the permanent magnet and modulated by a change in tensile stress in a surface of a shaft, the tensile stress resulting from an application of a twisting force to the shaft, the processing circuitry being configured to translate the signal to a value of the force, and output an indication of the value of the force,
wherein the permanent magnet and the sensor die are encapsulated in an encapsulating material, the encapsulating material being used to form a package of the sensor, and
wherein the plurality of sensing elements are arranged in a bridge circuit, the signal that is translated includes an output of the bridge circuit and the plurality of sensing elements are the only magnetic field sensing elements used in generating the indication of the value of the force.

2. The sensor of claim 1, wherein the permanent magnet and the sensor die are disposed on opposite sides of the supporting member.

3. The sensor of claim 1, wherein the supporting member includes at least one of a leadframe or a paddle.

4. The sensor of claim 1, wherein the permanent magnet is coupled to the supporting member via a layer of dielectric material.

5. The sensor of claim 1, wherein each of the plurality of sensing elements includes at least one of a receiving coil, giant magnetoresistance element (GMR), an anisotropic magnetoresistance element (AMR), a tunneling magnetoresistance element (TMR), and a magnetic tunnel junction element (MTJ).

6. A sensor, comprising:
a supporting member;
a sensor die;
a transmitting coil that is formed on the sensor die;
a plurality of sensing elements and a processing circuitry that are formed on the sensor die, the plurality of sensing elements being arranged to generate one or more signals in response to a pattern of magnetic flux density that is produced by the transmitting coil and modulated by a change in tensile stress in a surface of a shaft, the tensile stress resulting from an application of a twisting force to the shaft, the processing circuitry being configured to translate the signal to a value of the force, and output an indication of the value of the force,
wherein the supporting member and the sensor die are encapsulated in an encapsulating material, the encapsulating material being used to form a package of the sensor, and
wherein the plurality of sensing elements are arranged in a bridge circuit, the signal that is translated includes an output of the bridge circuit, and the plurality of sensing elements are the only magnetic field sensing elements used in generating the indication of the value of the force.

7. The sensor of claim 6, wherein the supporting member includes at least one of a leadframe or a paddle.

8. The sensor of claim 7, wherein the sensor further includes a driver for the transmitting coil, the driver being formed on the sensor die.

9. The sensor of claim 6, wherein each of the plurality of sensing elements includes at least one of a receiving coil, giant magnetoresistance element (GMR), an anisotropic magnetoresistance element (AMR), a tunneling magnetoresistance element (TMR), and a magnetic tunnel junction element (MTJ).

10. A sensor, comprising:
a magnetic field source; and
a sensor die having a plurality of sensing elements and processing circuitry formed on the sensor die, the plurality of sensing elements being arranged to generate a plurality of signals in response to a pattern of magnetic flux density that is produced by the magnetic field source and modulated by a change in tensile stress in a surface of a shaft the tensile stress resulting from an application of a force to the shaft, the processing circuitry being configured to map a signature to a value of the force, and output an indication of the value of the force,
wherein the magnetic field source and the sensor die are encapsulated in an encapsulating material that is used to form a package of the sensor,
wherein the plurality of sensing elements includes n sensing elements, where n is a positive integer greater than one, and the signature is an n-tuple, whereby each element of the n-tuple is a respective value of a different one of the plurality of signals, and
wherein the signature is mapped to the value of the force by using a look-up table.

11. The sensor of claim 10, further comprising a supporting member, wherein the magnetic field source includes a permanent magnet that is coupled to the supporting member.

12. The sensor of claim 11, wherein the supporting member includes at least one of a leadframe or a paddle.

13. The sensor of claim 11, wherein the magnetic field source and the sensor die are disposed on opposite sides of the supporting member.

14. The sensor of claim 10, wherein the magnetic field source includes a permanent magnet and the sensor die is disposed over the permanent magnet.

15. The sensor of claim 11, wherein the magnetic field source includes a transmitting coil, and the sensor further includes a driver for driving the transmitting coil that is formed on the sensor die.

16. The sensor of claim 11, wherein each of the plurality of sensing elements includes at least one of a receiving coil, giant magnetoresistance element (GMR), an anisotropic magnetoresistance element (AMR), a tunneling magnetoresistance element (TMR), and a magnetic tunnel junction element (MTJ).

17. A sensor, comprising:
a permanent magnet that is coupled to an external surface of a package of the sensor; and
a sensor die having a plurality of sensing elements and processing circuitry formed thereon, the plurality of sensing elements being arranged to generate a plurality of signals in response to a pattern of magnetic flux density that is produced by the permanent magnet and modulated by a change in tensile stress in a surface of a shaft the tensile stress resulting from an application of a force to the shaft, the processing circuitry being configured to map a signature to a value of athe force, and output an indication of the value of the force, wherein the sensor die is encapsulated in an encapsulating material, the encapsulating material being used to form the package of the sensor, wherein the plurality of sensing elements includes n sensing elements, where n is a positive integer greater than one, and the signature is an n-tuple, whereby each element of the n-tuple is a respective value of a different one of the plurality of signals, and wherein the signature is mapped to the value of the force by using a look-up table.

18. The sensor of claim 17, wherein the permanent magnet is disposed in a recess that is formed in the external surface of the package of the sensor.

\* \* \* \* \*